(12) United States Patent
Kolehmainen

(10) Patent No.: US 10,658,890 B2
(45) Date of Patent: May 19, 2020

(54) ROTOR FOR ROTATING ELECTRIC MACHINES

(71) Applicant: ABB Schweiz AG, Baden (CH)

(72) Inventor: Jere Kolehmainen, Vaasa (FI)

(73) Assignee: ABB Schweiz AG, Baden (CH)

( * ) Notice: Subject to any disclaimer, the term of this patent is extended or adjusted under 35 U.S.C. 154(b) by 69 days.

(21) Appl. No.: 15/770,398

(22) PCT Filed: Sep. 14, 2016

(86) PCT No.: PCT/EP2016/071723
§ 371 (c)(1),
(2) Date: Apr. 23, 2018

(87) PCT Pub. No.: WO2017/067719
PCT Pub. Date: Apr. 27, 2017

(65) Prior Publication Data
US 2018/0316231 A1 Nov. 1, 2018

(30) Foreign Application Priority Data
Oct. 22, 2015 (EP) ...................... 15191034

(51) Int. Cl.
*H02K 1/24* (2006.01)
(52) U.S. Cl.
CPC .................... *H02K 1/246* (2013.01)
(58) Field of Classification Search
CPC .. H02K 1/20; H02K 1/22; H02K 1/24; H02K 1/246; H02K 1/32; H02K 15/00;
(Continued)

(56) References Cited

U.S. PATENT DOCUMENTS

| 3,862,446 A | * | 1/1975 | Hilgeman | H02K 1/246 310/163 |
| 5,893,205 A | * | 4/1999 | McClelland | H02K 1/246 29/598 |

(Continued)

FOREIGN PATENT DOCUMENTS

| DE | 102014014487 A1 | 8/2015 |
| EP | 2790295 A1 | 10/2014 |
| EP | 2790296 A1 | 10/2014 |

OTHER PUBLICATIONS

European Patent Office, International Search Report & Written Opinion issued in corresponding Application No. PCT/EP2016/071723, dated Dec. 8, 2016, 11 pp.
(Continued)

*Primary Examiner* — Tran N Nguyen
(74) *Attorney, Agent, or Firm* — Taft Stettinius & Hollister LLP; J. Bruce Schelkopf

(57) ABSTRACT

A rotor for a rotating machine having a number n of poles pairs p that define corresponding direct pole axis (D-axis) and quadrature axis (Q-axis), and including a rotor core having a plurality of magnetically conductive laminations stacked in a rotor axial direction z. The magnetically conductive laminations include cut-out portions forming a plurality of flux barriers extending continuously with respect to the Q axis from a first rim portion to a second rim portion of the magnetically conductive laminations, the flux barriers being radially alternated by flux paths. The plurality of flux barriers form a corresponding plurality of cavities extending in the rotor core along the axial direction z, at least some of the plurality of cavities being filled with an electrically conductive and magnetically non-conductive material. The rotor further includes a plurality of channels spaced circumferentially and along the axial direction z, each of the channels transversally connecting two adjacent cavities of
(Continued)

the plurality of cavities, at least some of the channels being filled with a non-magnetically conductive material.

20 Claims, 14 Drawing Sheets

(58) Field of Classification Search
CPC .. H02K 15/0012; H02K 17/16; H02K 17/165; H02K 17/20; H02K 17/205; H02K 19/14
See application file for complete search history.

(56) References Cited

U.S. PATENT DOCUMENTS

| | | | |
|---|---|---|---|
| 2003/0020351 A1* | 1/2003 | Lee | H02K 1/246 310/156.53 |
| 2003/0111927 A1 | 6/2003 | Takita et al. | |
| 2006/0108888 A1* | 5/2006 | Jung | H02K 1/246 310/211 |
| 2006/0284512 A1* | 12/2006 | Lee | H02K 1/246 310/216.008 |
| 2013/0119819 A1* | 5/2013 | Lendenmann | H02K 1/246 310/216.107 |
| 2016/0352161 A1 | 12/2016 | Lange et al. | |

OTHER PUBLICATIONS

European Patent Office, Extended Search Report issued in corresponding Application No. 15191034.6, dated Apr. 11, 2016, 7 pp.

* cited by examiner

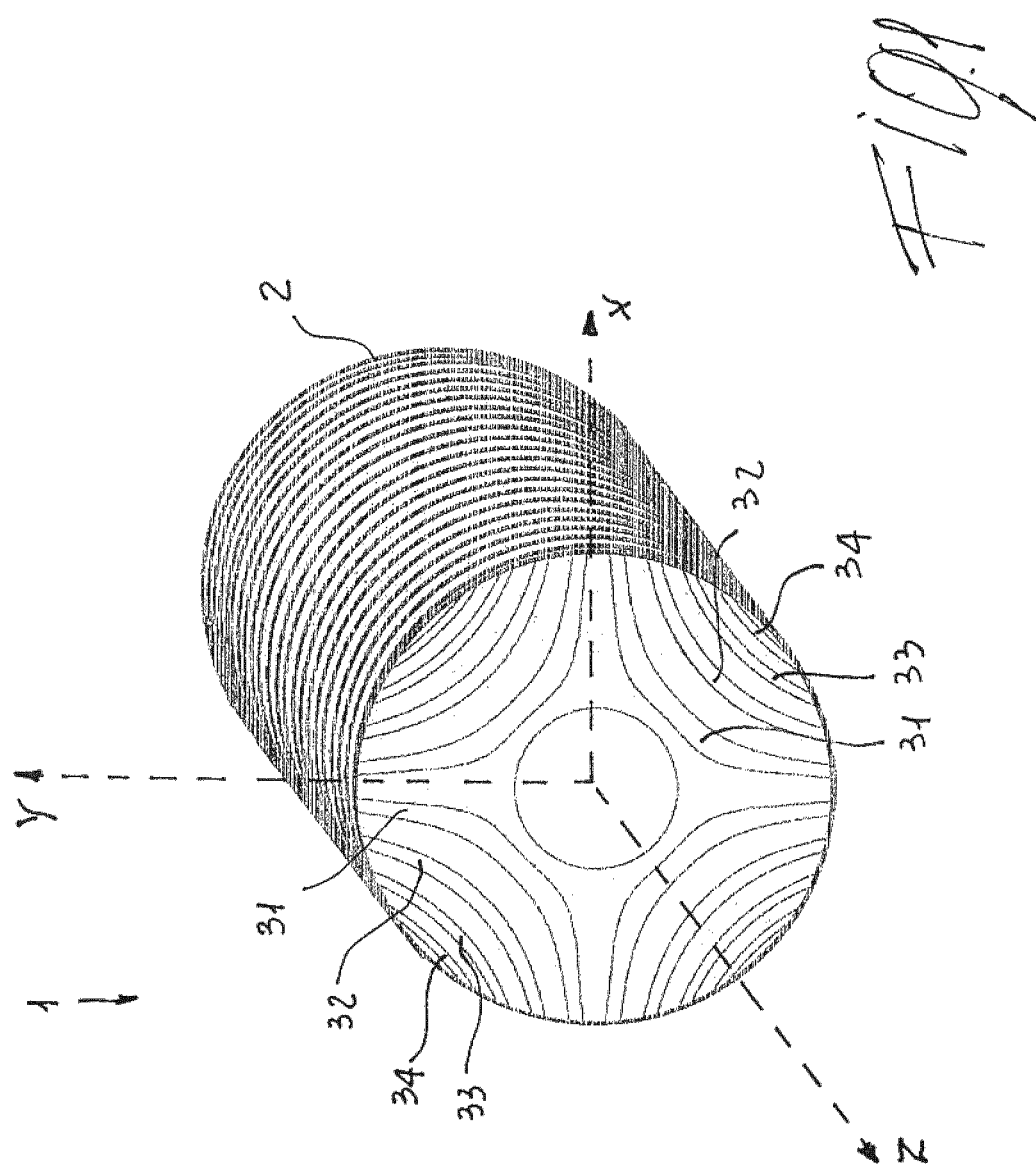

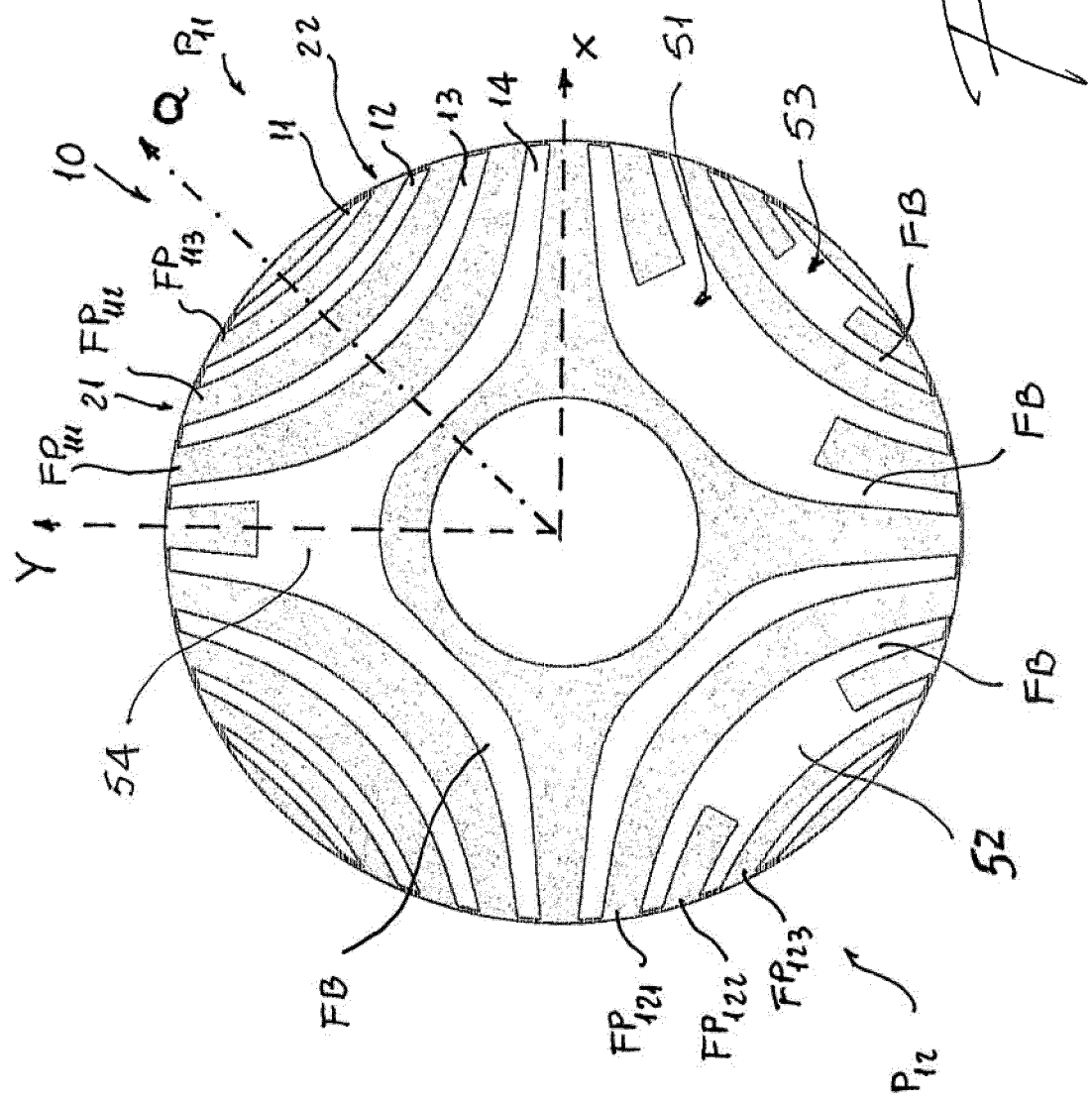

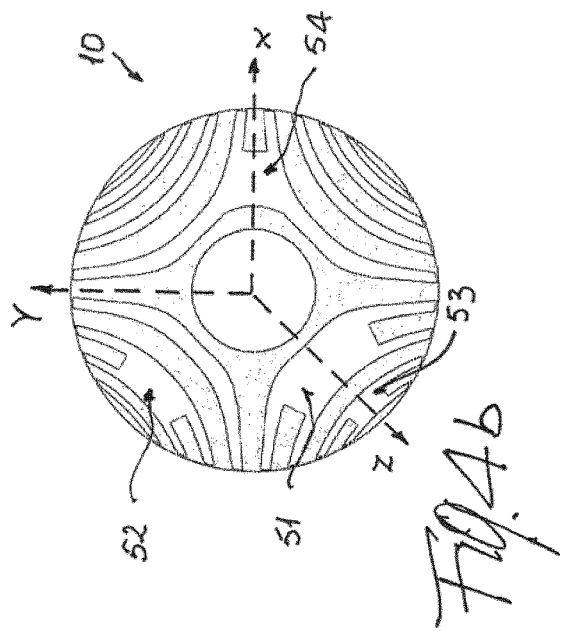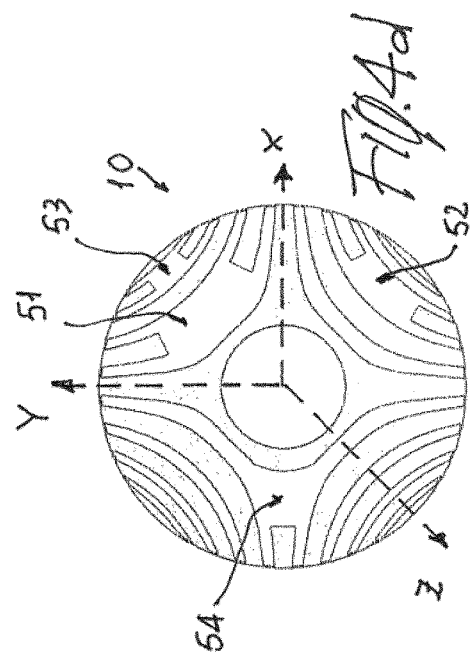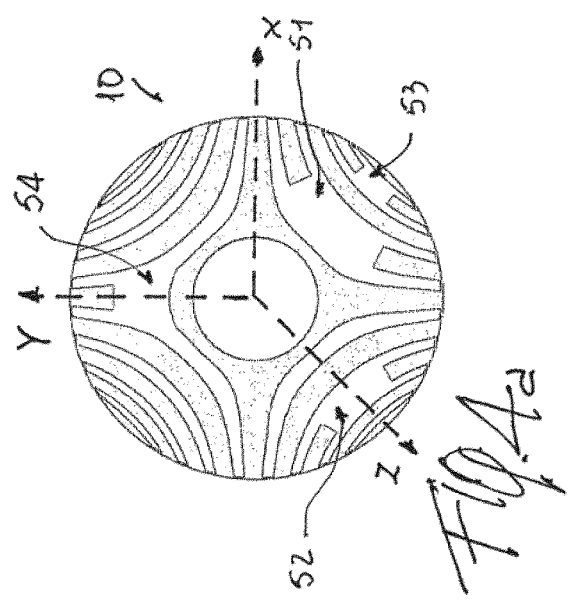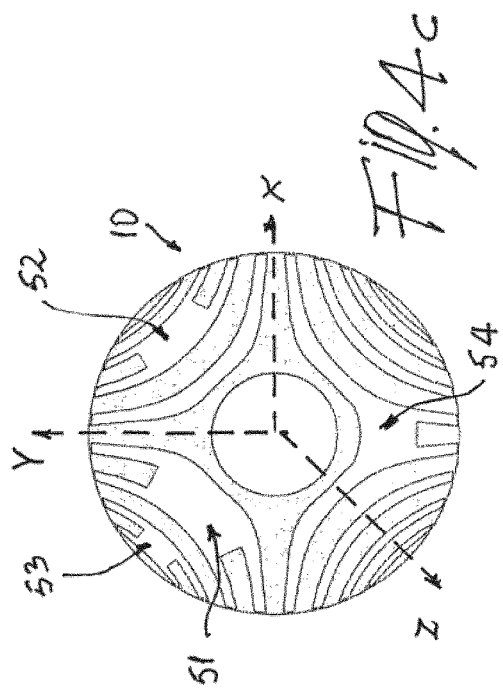

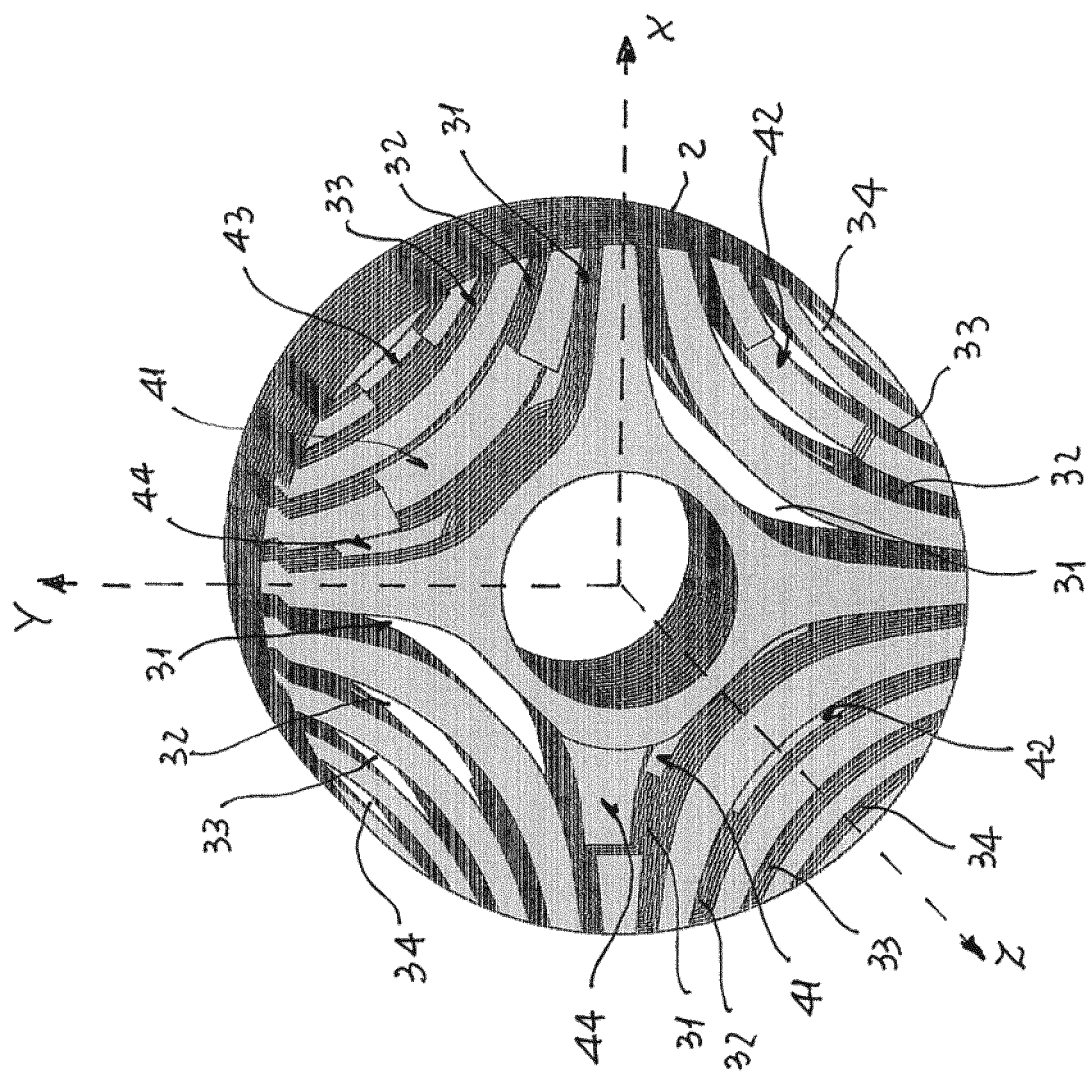

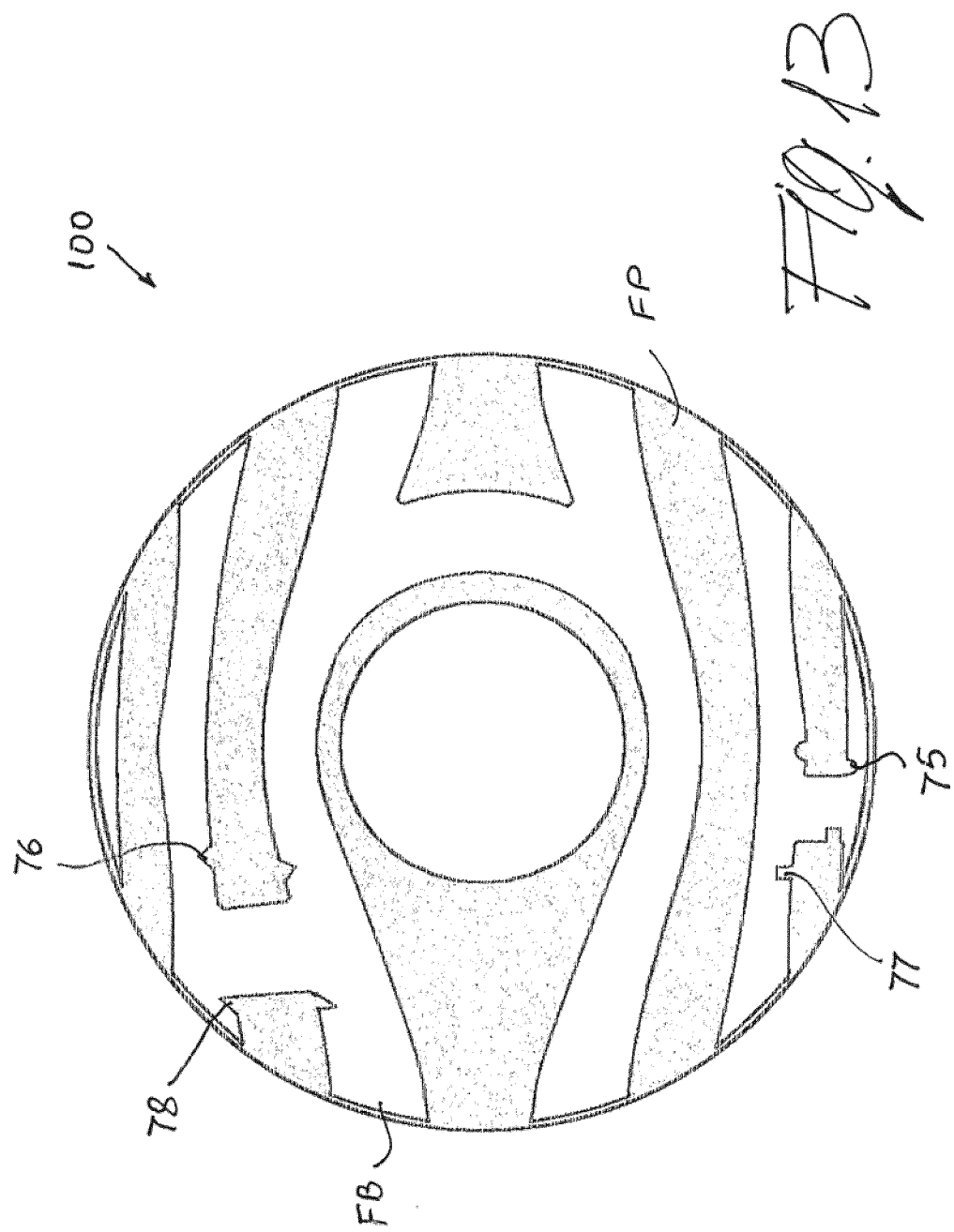

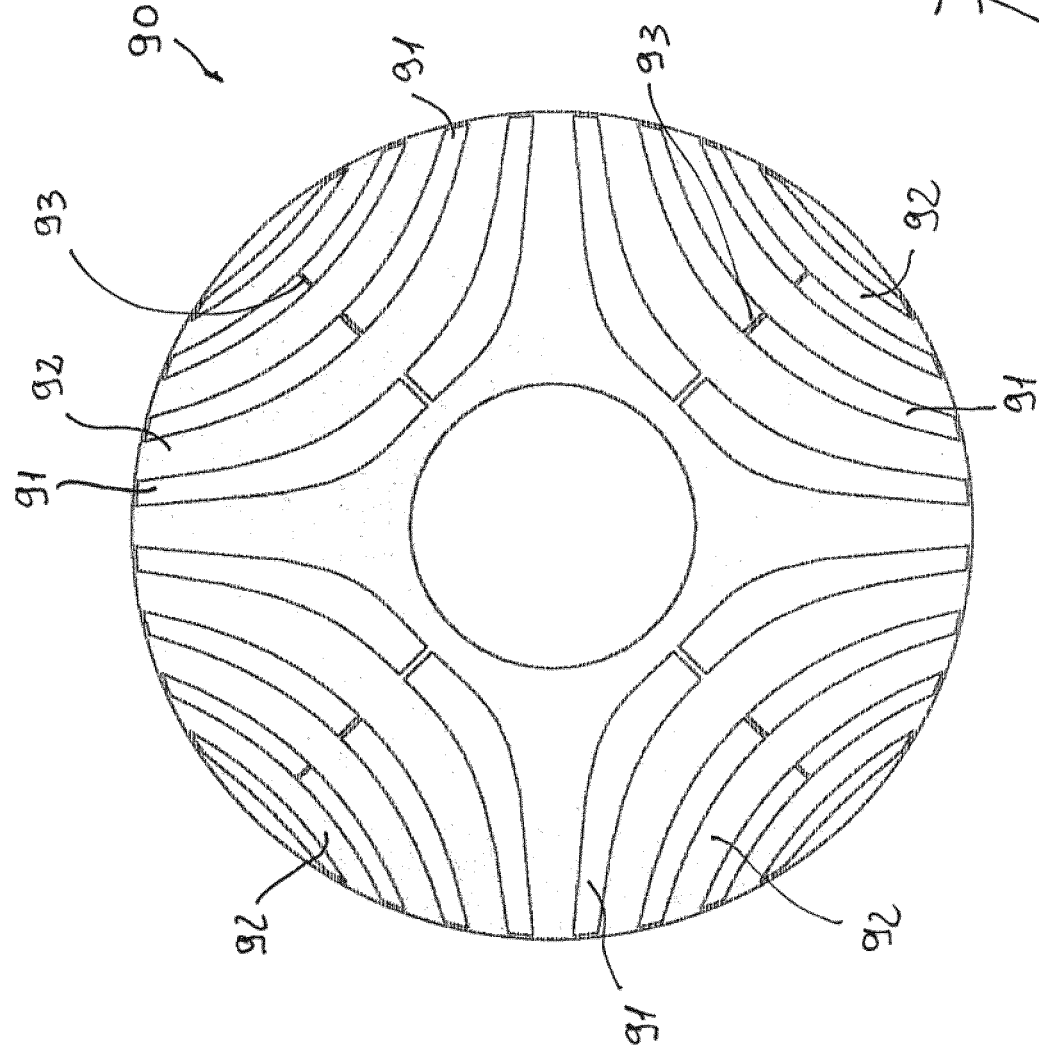

ROTOR FOR ROTATING ELECTRIC MACHINES

The present invention relates to a rotor for a rotating machine, in particular to a rotor for a synchronous reluctance machine. More in particular, the present invention relates to rotor for a synchronous reluctance machine having improved mechanical strength and better electrical properties. Moreover, the present invention also relates to a rotating electric machine, in particular a synchronous reluctance machine, comprising such rotor.

Rotors for synchronous reluctance machines of known type are typically formed by a substantially cylindrical laminate stack having a plurality of magnetically conductive laminations which comprise flux conducting sections as well as flux barrier sections, thereby forming one or more pole pairs. The flux conducting sections and the flux barrier sections differ from one another to a varying degree of magnetic permeability, the section having a high magnetic conductivity being generally designated as the d-axis of the rotor, and the section having a comparably lower magnetic conductivity being generally designated as the q-axis of the rotor. An optimal torque yield is achieved when the d-axis has a magnetic conductivity as high as possible while the q-axis has a magnetic conductivity as low as possible.

In practice, this is normally achieved by making cut-outs of proper shape in the magnetically conductive lamination along the q-axis; the cut-outs are filled with air, whereby the magnetic flux is inhibited in the direction of the q-axis and, as a consequence, the magnetic permeability decreases.

It is also known that for line starting or direct-online (DOL) versions of the synchronous reluctance motors, there are solutions that foresee a squirrel cage structure buried inside the laminated stack and obtained by filling the cut-out portions of the magnetically conductive laminations with a conductive material, e.g., aluminum or copper.

However, it is known that synchronous reluctance machines made from solid electric sheets have always limited strength against centrifugal force. In order to solve, or at least to limit, such problem, known solutions propose magnetically conductive laminations with supporting bridges between the flux paths.

A typical example of known magnetically conductive laminations is shown in the attached FIG. 14. In this case, the magnetically conductive lamination 90 comprises a number of cut-out portions 91 forming flux barriers between the flux paths 92. The flux barriers 91 are interrupted by supporting bridges 93 connecting two adjacent flux paths 92 in order to provide the necessary mechanical properties to the resulting rotor structure.

One of the drawbacks of known solution is the possible flux leakage from one flux path to another due to the reinforcing bridges between the flux paths 92, resulting in a decrease of dielectrical performances of the machine.

The supporting bridges should therefore be as narrow as possible in order to minimize the flux leakage, but this is normally difficult to achieve with the conventional punching techniques used for manufacturing the magnetically conductive laminations. Other solutions have been proposed, but they are normally much more cumbersome in terms of manufacturing times and costs.

Hence, the present disclosure is aimed at providing a rotor for a synchronous reluctance machine which allows overcoming at least some of the above mentioned shortcomings.

In particular, the present invention is aimed at providing a rotor for a synchronous reluctance machine that does not require supporting bridges in the lamination structure forming the rotor.

As a further aim, the present invention is aimed at providing a rotor for a synchronous reluctance machine with adequate mechanical strength and also with better electrical properties. As a further aim, the present invention is aimed at providing a rotor for a synchronous reluctance machine with reduced manufacturing times and costs.

Thus, the present invention relates to a rotor for a synchronous reluctance machine having a number n of poles pairs p that define corresponding direct pole axis (D-axis) and quadrature axis (Q-axis), and comprising a rotor core having a plurality of magnetically conductive laminations stacked in a rotor axial direction z; the rotor of the invention is characterized in that the magnetically conductive laminations comprise cut-out portions forming a plurality of flux barriers extending continuously from a first rim portion to a second rim portion of said magnetically conductive laminations, radially alternated by flux paths, said plurality of flux barriers forming a corresponding plurality of cavities extending in the rotor core along said axial direction z, at least some of said plurality of cavities being filled with a magnetically non-conductive material; the rotor of the invention further comprises a plurality of channels spaced circumferentially and along the axial direction z, each of said channels transversally connecting two adjacent cavities of said plurality of cavities, at least some of said channels being at least partially filled with a magnetically non-conductive material.

The magnetically non-conductive material can be electrically conductive or electrically non-conductive according to the needs. When a squirrel cage is needed, such material is electrically conductive, whereas when, e.g., no self-starting capabilities are required such material can be, e.g., an insulating resin. In the following description reference will be made to a squirrel-cage motor without limiting the invention.

As better explained in the following description, thanks to the particular structure and functionality of the rotor for a synchronous reluctance machine according to the present invention, the mechanical and electrical properties are greatly improved and there is no need of supporting bridges in the lamination structure of the rotor.

In practice, in the magnetically conductive laminations forming the rotor of the present invention the flux barriers extend continuously without being interrupted by supporting bridges connecting two adjacent flux paths, thereby avoiding any flux leakage from one flux path to another. Indeed, it has been seen that by getting rid of supporting bridges, the machine efficiency and power factor can be increased remarkably.

Moreover, in the rotor according to the present invention, the channels which connect transversally (i.e. radially) two adjacent cavities and which are spaced circumferentially and along the axial direction z of the rotor, are good paths for casting the material forming the squirrel cage. As a result, the rotor has remarkably stronger structure even without supporting bridges between the flux paths.

A rotating machine, in particular a synchronous reluctance machine, comprising a rotor according to the present disclosure, is also part of the present invention.

Advantageously, the cut-out portions forming the flux barriers in the magnetically conductive laminations extend also symmetrically with respect to said Q axis from a first rim portion to a second rim portion of said magnetically conductive laminations According to a preferred embodiment of the rotor of the present invention, one or more of said flux paths in the magnetically conductive lamination have at least one channel-forming cut-out connecting two adjacent flux barriers of the same pole and/or of a different pole. In practice, at least one flux path in the lamination is not continuous but it is cut-out thereby forming a connection between two adjacent flux barriers. By superimposing a number of such laminations so that the cut-out portions are axially aligned, a rotor section is created in which two adjacent cavities are connected through the channel formed by the superimposed channel-forming cut-out portions of the lamination.

In other words, the structure of the rotor according to the present invention can be obtained by properly stacking a number of magnetically conductive laminations in which, for at least one pole pair, at least a part of the flux paths of one pole are different from the flux paths of the other pole.

In practice, in the magnetically conductive lamination forming the rotor according to the present invention, for at least one pole pair, at least a part of the channel-forming cut-outs of the flux paths of one pole are different from the channel-forming cut-outs of the flux paths of the other pole. In this respect, for the purposes of the present invention, it has to be noted that the term "a part of the channel-forming cut-outs of the flux paths of one pole are different from the channel-forming cut-outs of the flux paths of the other pole" is meant to include also cases in which the flux paths of only one pole have the channel-forming cut-outs, while the flux paths of the other pole are uninterrupted, i.e. do not have channel-forming cut-outs.

Preferably, the width of one or more of said flux paths is not uniform and is comprised between a Wmax and a Wmin, and the channel-forming cut-out are formed in areas where the width is Wmax. For the purposes of the present invention, the width of said flux paths is measured in the radial direction.

According to a particular embodiment of the rotor of the present invention, the cut-outs in the flux paths can also partial, i.e. instead of cutting completely the flux-paths, thereby creating a channel between two adjacent cavities, it is also possible to cut-out only a part of the flux-paths, thereby creating a recess communicating with only one of the cavities.

According to a preferred embodiment of the rotor of the present invention, the rotor core comprises a first plurality of channels which connect the same first two adjacent cavities and a second plurality of channels which connect the same second two adjacent cavities. In practice, for mechanical and electrical reasons, it is preferable to have a number of channels which radially connects two adjacent cavities along the longitudinal development of the rotor core. In particular, in order to have a symmetrical structure of the rotor core, it is preferable to have a plurality of channels connecting the same two adjacent cavities, said channels being regularly spaced at constant angles around the axial direction z of the rotor core. For the purposes of the present invention, the term "regularly spaced at constant angles around the axial direction z" is referred to the projection of said channels on a plane perpendicular to the axial direction z. For instance, considering four channels and two alternative positions thereof, starting from a reference angular position the channels can be positioned at 0°, 90°, 180° and 270°, or at 0°, 90°, 270° and 180° (other alternative positions are also possible). In both cases, when considering their projection on a plane perpendicular to the axial direction z, such projections are regularly spaced at a constant angle of 90° around the axial direction z. Preferably, said channels are also regularly spaced at constant distance along said axial direction z.

From a manufacturing standpoint, as better explained in the following detailed description, the rotor according to the present invention can be conveniently manufactured by using, for at least a length of the rotor core, a plurality of magnetically conductive laminations having the same structure.

Indeed, a rotor according to the present invention can be manufactured:
  by appropriately shaping the magnetically conductive laminations so that, for at least one pole pair, the channel-forming cut-outs of the flux paths of one pole are different from the channel-forming cut-outs of the flux paths of the other pole; and
  by appropriately stacking the magnetically conductive laminations, so that a plurality of channels spaced circumferentially and along the axial direction are formed in the rotor core.

In practice, in at least a length of the rotor core, a first portion is advantageously made by a first stack of magnetically conductive laminations having the same structure and the same first orientation with respect to a xyz reference system, in which the z axis is aligned with the rotor axial direction z and at least one of the x and y axis is aligned with at least one of said D-axis and/or Q-axis, and at least a second portion is advantageously made by a second stack of magnetically conductive laminations having the same structure and the same second orientation with respect to said xyz reference system, said first orientation being different from said second orientation.

More in particular, at least a length of said rotor core preferably comprises a plurality of portions made by a plurality of stacks of magnetically conductive laminations having the same structure and a corresponding plurality of orientations with respect to said xyz reference system, said plurality of orientations (and the corresponding plurality of rotor core portions) being obtained by rotation of said magnetically conductive laminations around said z axis of an angle $\alpha = m(\pi/n)$, where m is an integer having value $1 \leq m \leq 2n$ and n is the number of pole pairs, and/or by a 180° rotation around said D-axis and/or Q-axis.

Thus, according to a particular embodiment, for a four-pole rotor, i.e. when the number of pole pairs is n=2, a possible configuration of said at least a length of rotor core can be the following:
  a first portion has a plurality of magnetically conductive laminations having a first orientation with respect to said xyz reference system;
  a second portion has a plurality of magnetically conductive laminations having a second orientation with respect to said xyz reference system, said second orientation being obtained by rotation of the magnetically conductive laminations around said z axis of an angle $\alpha = \pi/2$ with respect to said first orientation;
  a third portion has a plurality of magnetically conductive laminations having a third orientation with respect to said xyz reference system, said third orientation being obtained by rotation of the magnetically conductive laminations around said z axis of an angle $\alpha = \pi$ with respect to said first orientation;
  a fourth portion has a plurality of magnetically conductive laminations having a fourth orientation with respect to said xyz reference system, said fourth orientation being obtained by rotation of the magnetically conductive laminations around said z axis of an angle α=(3/2) π with respect to said first orientation.

In such a case, at least a length of said rotor core comprises four portions made by a plurality of stacks of magnetically conductive laminations having the same structure and corresponding four different orientations with respect to said xyz reference system, said orientations being obtained by rotation around said z axis.

In case of a two-pole rotor, i.e. when the number of pole pairs is n=1, a possible configuration of said at least a length of rotor core can be the following:
- a first portion has a plurality of magnetically conductive laminations having a first orientation with respect to said xyz reference system;
- a second portion has a plurality of magnetically conductive laminations having a second orientation with respect to said xyz reference system, said second orientation being obtained by rotation of the magnetically conductive laminations around said Q-axis of an angle of 180° and then around said D-axis of an angle of 180° with respect to said first orientation;
- a third portion has a plurality of magnetically conductive laminations having a third orientation with respect to said xyz reference system, said third orientation being obtained by rotation of the magnetically conductive laminations around said D-axis of an angle of 180° with respect to said first orientation;
- a fourth portion has a plurality of magnetically conductive laminations having a fourth orientation with respect to said xyz reference system, said fourth orientation being obtained by rotation of the magnetically conductive laminations around said Q-axis of an angle of 180° with respect to said first orientation.

In such a case, at least a length of said rotor core comprises four portions made by a plurality of stacks of magnetically conductive laminations having the same structure and corresponding four different orientations with respect to said xyz reference system, said orientations being obtained by rotation around said z axis and around said Q-axis and D-axis.

Further features and advantages of the present invention will be more clear from the description of preferred but not exclusive embodiments of a rotor for a synchronous reluctance machine according to the invention, shown by way of examples in the accompanying drawings, wherein:

FIG. 1 is a perspective view of a first embodiment of a rotor for a synchronous reluctance machine according to the invention;

FIG. 2 is a plane view of a magnetically conductive lamination in the rotor for a synchronous reluctance electrical machine of FIG. 1;

FIGS. 4a-4d show four different orientations of the lamination of FIG. 2 in a xyz reference system;

FIG. 5 is a perspective view of a portion of the rotor for a synchronous reluctance electrical machine of FIG. 1;

FIG. 13 is a plane view of a second alternative embodiment of the magnetically conductive lamination of FIG. 8;

FIG. 14 is a plane view of a typical embodiment of a magnetically conductive lamination in a rotor for a synchronous reluctance machine of known type.

Figure 3B:
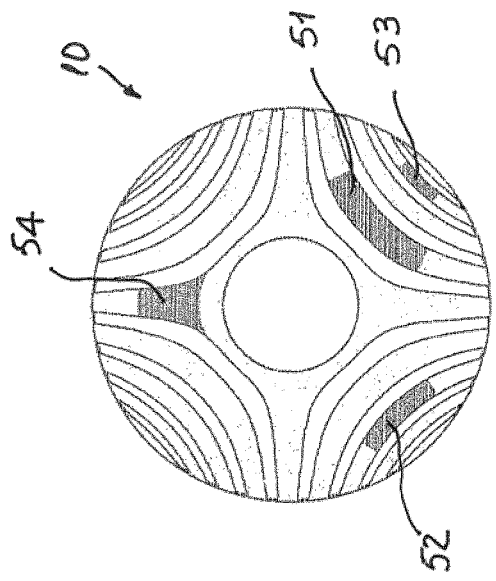
FIGS. 3a-3c show how the structure of the lamination of FIG. 2 can be obtained.

The rotor according to the invention is used in synchronous reluctance machines having a number n of pole pairs (p). In the following detailed description and in the attached figures, for sake of simplicity, the present invention will be described with reference to a rotor for a four-pole synchronous reluctance electrical machine (i.e. with a number of pole pairs n=2) and to a rotor for a two poles synchronous reluctance electrical machine (i.e. with a number of pole pairs n=1). The same structure and principles can of course be replicated in rotors with a different number of poles.

With reference to the attached FIGS. 1-5, according to a first specific embodiment of the present invention, the rotor for a synchronous reluctance electrical machine, generally designated with the reference numeral 1, has a number n=2 of poles pairs that define corresponding direct pole axis (D-axis) and quadrature axis (Q-axis).

By using an xyz reference system, the x and y axis are aligned to a D-axis, while the z axis is aligned with the rotor axial direction. As shown in FIG. 2, the Q-axis is the axis bisecting two adjacent D-axis (i.e. the x and y axis).

The rotor 1 according to the present invention comprises a rotor core 2 having a plurality of magnetically conductive laminations 10 which are stacked in the rotor axial direction z. With reference to FIG. 2, one of the characterizing features of the rotor 1 according to the present invention is given by the fact that the magnetically conductive laminations 10 comprise cut-out portions 11, 12, 13, 14 which form a plurality of flux barriers (FB) extending continuously with respect to said Q axis from a first rim portion 21 to a second rim portion 22 of the magnetically conductive laminations 10. The flux barriers are radially alternated by flux paths (FP).

As previously said, with the term "extending continuously" it is meant that the cut-out portions 11, 12, 13, 14 (and consequently the FB) are not interrupted by bridges connecting two adjacent flux paths.

With reference to FIGS. 1 and 5, the plurality of flux barriers (FB) form a corresponding plurality of cavities 31, 32, 33, 34 which extend in the rotor core 2 along the axial direction z. Furthermore, with reference to FIG. 5, the rotor 1 according to the present invention comprises a plurality of channels 41, 42, 43, 44 which are spaced circumferentially and along the axial direction z, each of said channels 41, 42, 43, 44 transversally connecting two adjacent cavities of said plurality of cavities 31, 32, 33, 34. In practice, for at least a length of the rotor core 2, the cavities 31, 32, 33, 34 extend continuously in the axial direction z, while the channels 41, 42, 43, 44 put two adjacent cavities into communication at discrete points along and around the axial direction z.

By filling at least some of said cavities 31, 32, 33, 34 and at least some of said channels 41, 42, 43, 44 with an electrically conductive and magnetically non-conductive material, e.g. aluminum or copper, a squirrel cage is obtained. As previously explained, the resulting structure is free from any bridge between the flux paths (FP), thereby avoiding any problem of flux leakage and consequent drawbacks in terms of efficiency and performance. At the same time, the cage structure resulting from the material filling the cavities 31, 32, 33, 34 and the channels 41, 42, 43, 44 greatly improves the mechanical strength both in the axial and radial direction.

With reference to FIG. 2, according to this preferred embodiment of rotor 1 of the present invention, one or more of said flux paths (FP) in said magnetically conductive lamination 10 have at least one channel-forming cut-out 51, 52, 53, 54 which connect two adjacent flux barriers (FB). The channel-forming cut-out 51, 52, 53 connect adjacent flux barriers of the same pole while the channel-forming cut-out 54 connects adjacent flux barriers belonging to different poles.

Figure 3C:
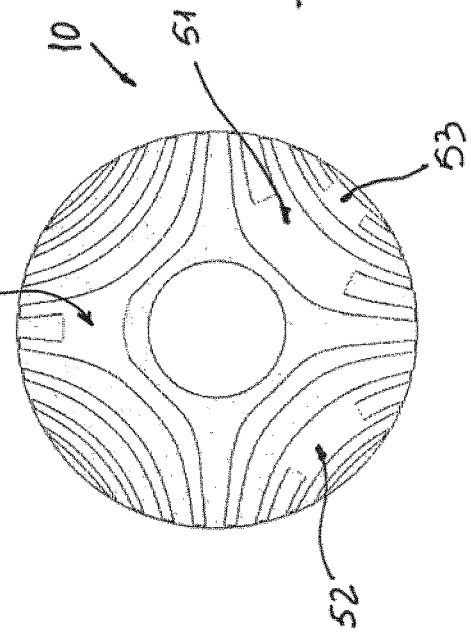
Figure 3D:
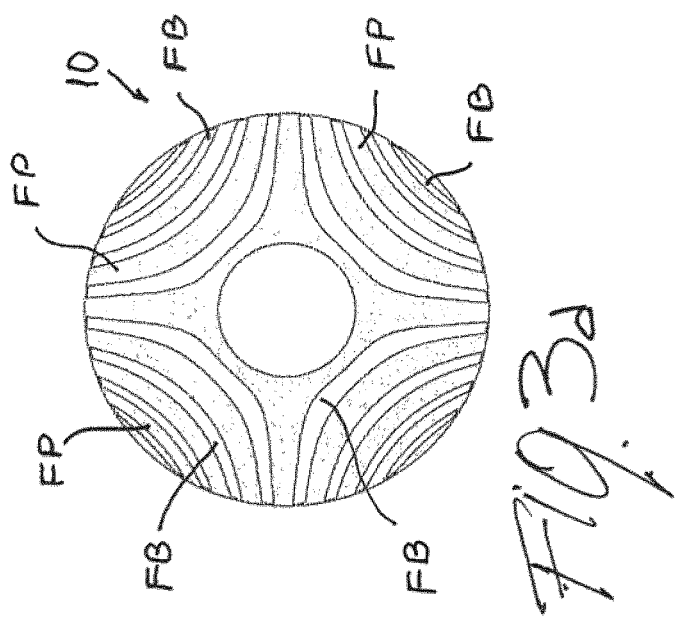

With reference to FIGS. 3a-3c, the magnetically conductive lamination 10 comprising the channel-forming cut-outs 51, 52, 53, 54 can be easily obtained starting from a symmetrical configuration (FIG. 3a) and removing a part of the flux paths (dark grey areas of FIG. 3b), so as to obtain the final structure of FIG. 3c. From a manufacturing standpoint, the lamination of FIG. 3c can be directly obtained with a single punching operation by simultaneously cutting out the flux barriers (FB) and the cut-outs 51, 52, 53, 54 in the flux paths (FP).

As shown in the above mentioned figures, the magnetically conductive laminations 10 has preferably an asymmetric structure, since for at given pole pair at least a part of the flux paths $FP_{111}, \ldots, FP_{11n}$ of one pole $P_{11}$ are different from the flux paths $FP_{121}, \ldots, FP_{12n}$ of the other pole $P_{12}$.

In practice, according to this embodiment, in the magnetically conductive lamination 10 the channel-forming cut-outs of the flux paths $FP_{111}, \ldots, FP_{11n}$ of the pole $P_{11}$ (i.e. the cut-out 54) are different from the channel-forming cut-outs of the flux paths $FP_{121}, \ldots, FP_{12n}$ of the other pole $P_{12}$ (i.e. the cut-out 52). It is worth noting that also the channel-forming cut-outs of the flux paths of the other pole pair are different (cut-outs 51 and 53 for one pole, cut-out 54 for the other pole).

With reference to FIG. 5, the rotor core 2 preferably comprises a first plurality of channels 41 connecting the same first two adjacent cavities 31, 32 and a second plurality of channels 42 connecting the same second two adjacent cavities 32, 33. In practice, the number and positioning of the channels 41, 42, 43, 44 can be varied by appropriately stacking a number of magnetically conductive lamination 10 in different order. In particular, it is preferred to have the channels 41, 42, 43, 44 regularly spaced at constant angles around the axial direction z and at constant distance along said axial direction z so as to have a uniform structure of the rotor 1. One of the peculiar feature of the rotor 1 according to the present invention is given by the fact that it can be obtained by using a plurality of magnetically conductive laminations 10 having the same structure.

For instance with reference to FIGS. 4a-4d, the rotor 1 can be obtained by using the magnetically conductive laminations 10 of FIG. 2 superimposed in a number of stacks, the orientation of the magnetically conductive laminations 10 in each stack being the same, the various stack having a different orientation. Such different orientations can be obtained by rotation of the magnetically conductive laminations 10 around the z axis of an angle $\alpha=m(\pi/n)$, where m is an integer having value $1 \leq m \leq 2n$ and n is the number of pole pairs (p), and/or by a 180° rotation around said D-axis and/or Q-axis.

In the case of FIGS. 4a-4d, in which the number of pole pairs (p) is n=2, the first stack can be obtained by superimposing a number of magnetically conductive laminations 10 with the configuration of FIG. 4a; a second stack can be obtained by superimposing a number of magnetically conductive laminations 10 with the configuration of FIG. 4b, said configuration being obtained by rotation of the magnetically conductive laminations around said z axis of an angle $\alpha=\pi/2$ with respect to the configuration of FIG. 4a; a third stack can be obtained by superimposing a number of magnetically conductive laminations 10 with the configuration of FIG. 4c, said configuration being obtained by rotation of the magnetically conductive laminations around said z axis of an angle $\alpha=\pi$ with respect to the configuration of FIG. 4a; and a fourth stack can be obtained by superimposing a number of magnetically conductive laminations 10 with the configuration of FIG. 4d, said configuration being obtained by rotation of the magnetically conductive laminations around said z axis of an angle $\alpha=(3/2)\pi$ with respect to the configuration of FIG. 4a. A further stack, with a further rotation around the z axis of an angle $\alpha=\pi/2$ will have the same configuration of FIG. 4a.

The number of magnetically conductive laminations 10 in a stack, the number of stacks, as well as the different orientations between the stacks, can be chosen according to the needs. After the rotor stacks have been collected together, the cavities 31, 32, 33, 34 and the channels 41, 42, 43, 44 can be filled with, e.g., aluminum, or a similar non-magnetic material, by using, e.g., casting techniques, thereby obtained a cage buried inside the rotor core and developing in both the axial and radial direction.

Figure 6:
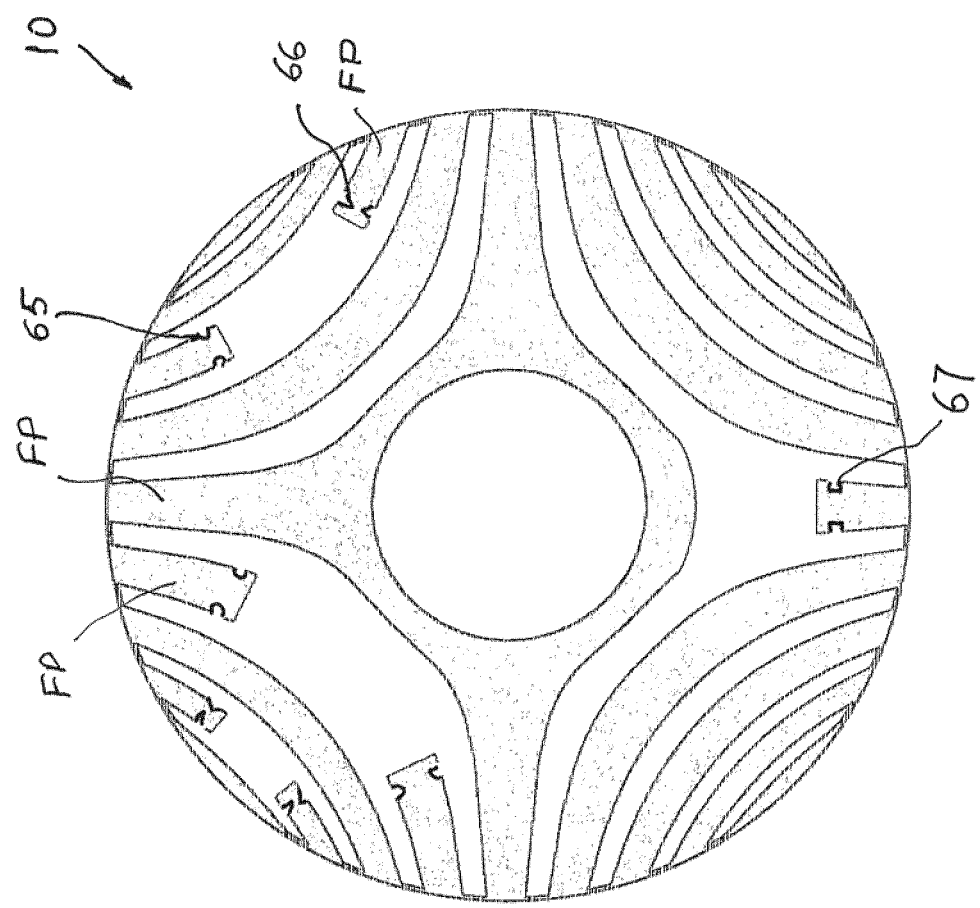
FIG. 6 is a plane view of an alternative embodiment of the magnetically conductive lamination of FIG. 2.

A particular embodiment of the rotor of the present invention is shown in FIG. 6. According to this embodiment, one or more notches 65, 66, or 67 can be obtained in the flux paths, in particular in correspondence of the channel forming cut-outs. The notches 65, 66, or 67 can have different shapes (e.g. circular 65, squared 67, triangular 66) and can be replaced by teeth protruding from the flux paths. Once the cavities 31, 32, 33, 34 and the channels 41, 42, 43, 44 are filled with, e.g. aluminum, also the notches 65, 66, or 67 are filled with such material and contribute to the mechanical strength of the structure.

With reference to the attached FIGS. 7-11, according to a second specific embodiment of the present invention, the rotor for a synchronous reluctance electrical machine, generally designated with the reference numeral 1, has a number n=1 of pole pairs that define corresponding direct pole axis (D-axis) and quadrature axis (Q-axis).

By using an xyz reference system, the x axis is aligned with the D-axis, the y axis is aligned with the Q-axis while the z axis is aligned with the rotor axial direction.

Figure 8:
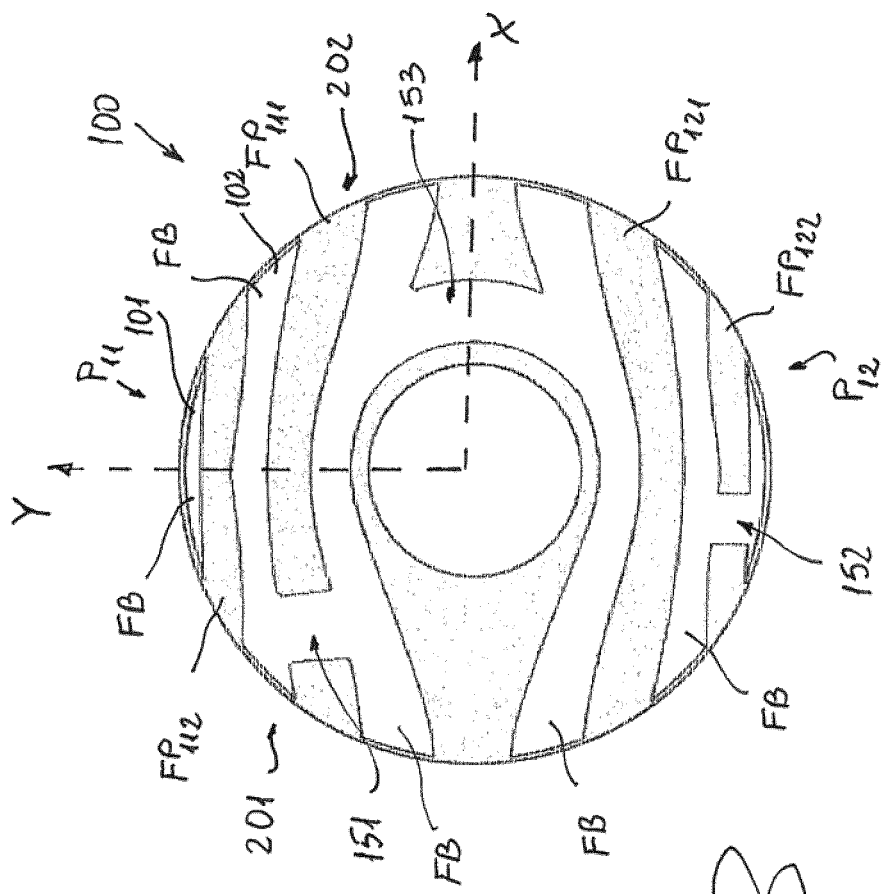
FIG. 8 is a plane view of a magnetically conductive lamination in the rotor for a synchronous reluctance electrical machine of FIG. 7.

The rotor 1 according to this embodiment comprises a rotor core 2 having a plurality of magnetically conductive laminations 100 which are stacked in the rotor axial direction z. With reference to FIG. 8, the magnetically conductive laminations 100 comprise cut-out portions 101, 102 which form a plurality of flux barriers (FB) extending continuously with respect to the Q-axis (y axis) from a first rim portion 201 to a second rim portion 202 of the magnetically conductive laminations 100. The flux barriers are radially alternated by flux paths (FP). Also in this case, with the term "extending continuously" it is meant that the cut-out portions 101, 102, are not interrupted by bridges connecting two adjacent flux paths.

Figure 7:
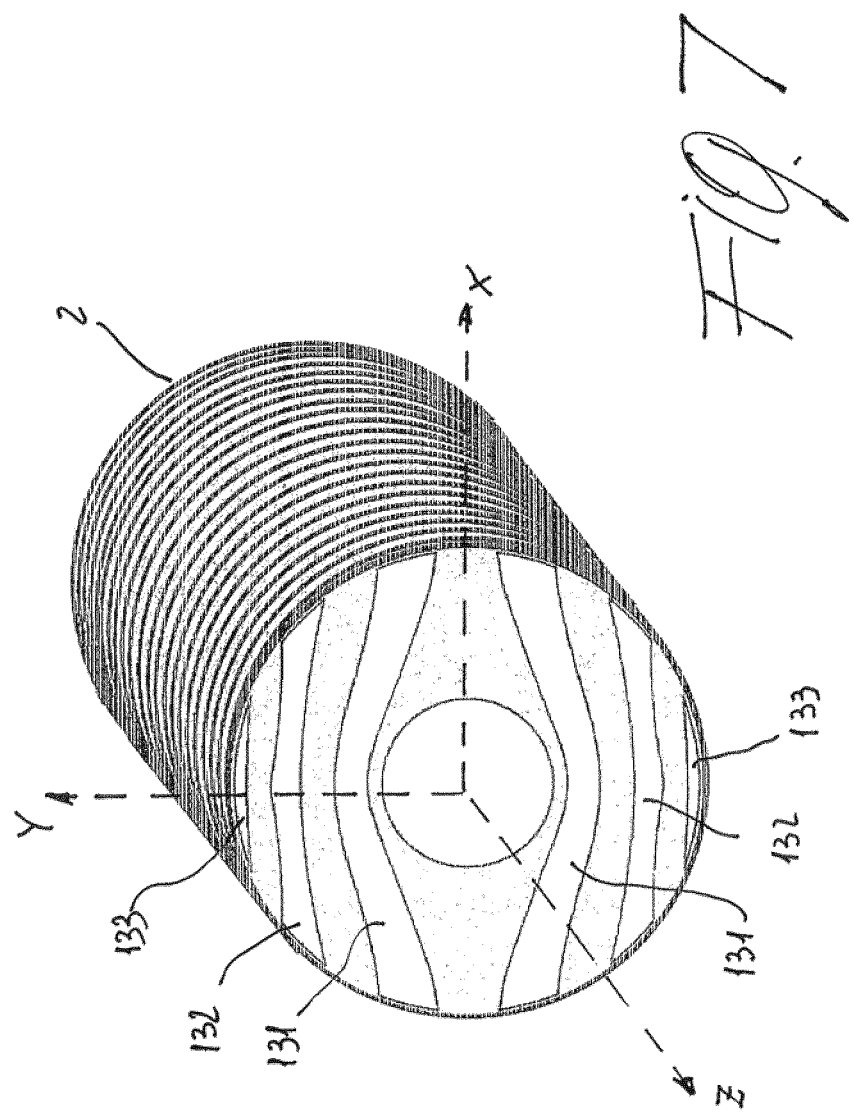
FIG. 7 is a perspective view of a second embodiment of a rotor for a synchronous reluctance machine according to the invention.
Figure 11:
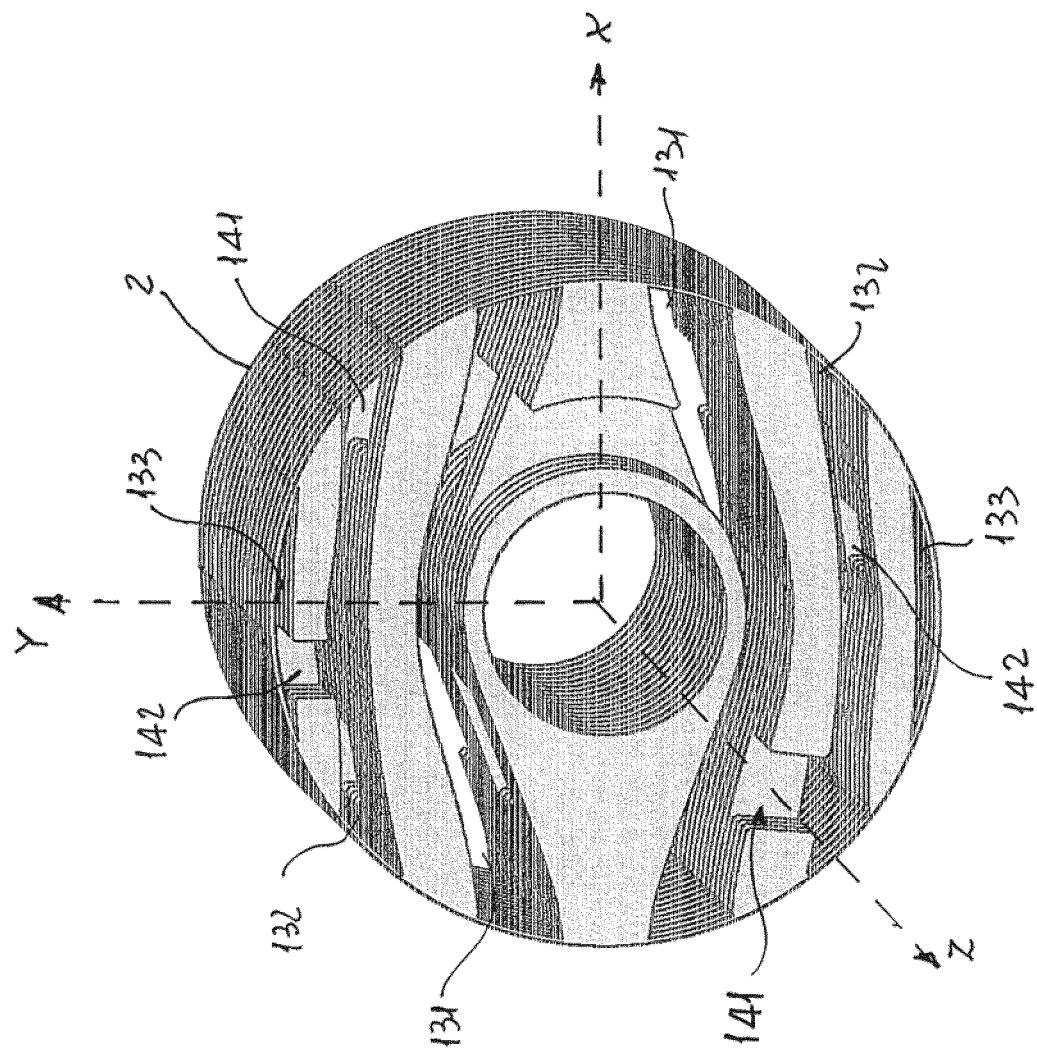
FIG. 11 is a perspective view of a portion of the rotor for a synchronous reluctance electrical machine of FIG. 7.

With reference to FIGS. 7 and 11, the plurality of flux barriers (FB) form a corresponding plurality of cavities 131, 132, 133, which extend in the rotor core 2 along the axial direction z. Furthermore, with reference to FIG. 11, the rotor 1 according to the present invention comprises a plurality of channels 141, 142, 143 which are spaced circumferentially and along the axial direction z, each of said channels 141, 142, 143 transversally connecting two adjacent cavities 131, 132, 133. In practice, for at least a length of the rotor core 2, the cavities 131, 132, 133 extend continuously in the axial direction z, while the channels 141, 142, 143, put two adjacent cavities into communication at discrete points along and around the axial direction z. By filling at least some of said cavities 131, 132, 133 and at least some of said channels 141, 142, 143 with an electrically conductive and magnetically non-conductive material, e.g. aluminum or copper, a squirrel cage is obtained. As in the previous case, the resulting structure is free from any bridge between the flux paths (FP), thereby avoiding any problem of flux leakage and consequent drawbacks in terms of efficiency and performance. At the same time, the cage structure greatly improves the mechanical strength both in the axial and radial direction.

With reference to FIG. 8, according to this preferred embodiment of rotor 1 of the present invention, one or more of said flux paths (FP) in said magnetically conductive lamination 100 have at least one channel-forming cut-out 151, 152, 153 which connect two adjacent flux barriers (FB). The channel-forming cut-out 151, and 152 connect adjacent flux barriers of the same pole while the channel-forming cut-out 153 connects adjacent flux barriers belonging to different poles.

Figure 9B:
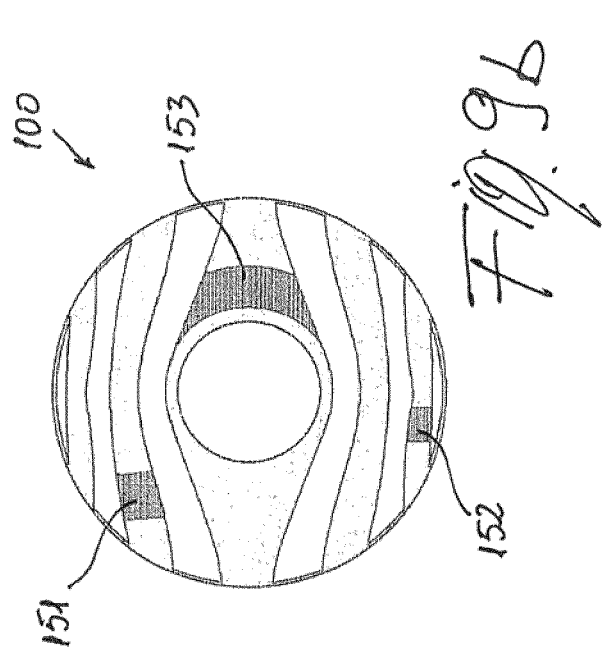
FIGS. 9a-9c show how the structure of the lamination of FIG. 8 can be obtained.
Figure 9C:
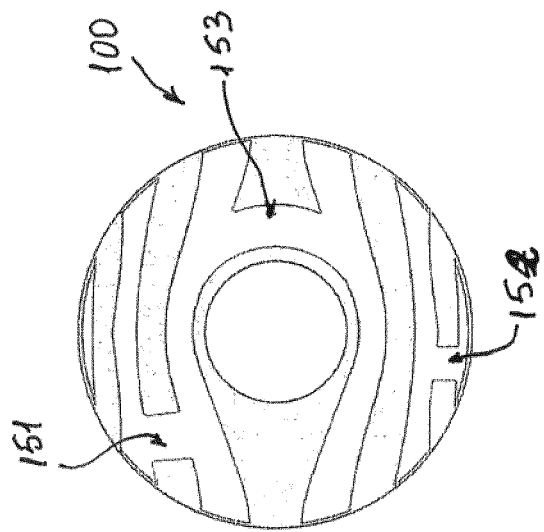
Figure 9D:
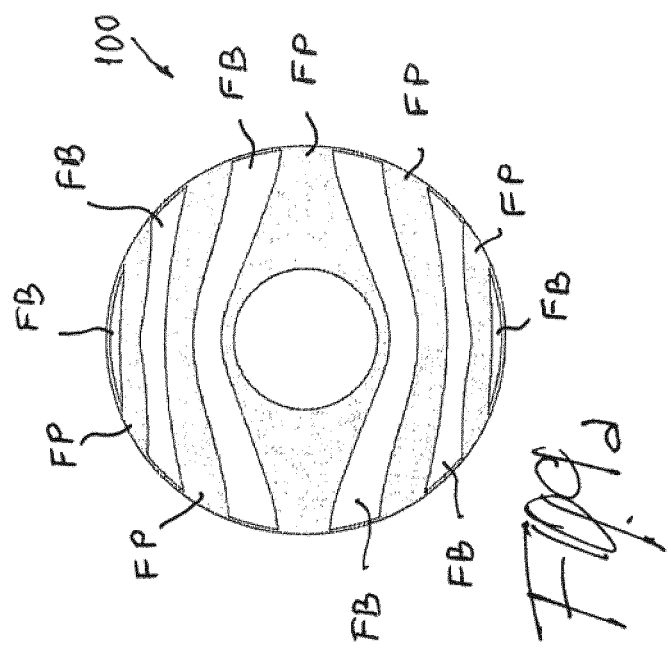

With reference to FIGS. 9a-9c, the magnetically conductive lamination 100 with the channel-forming cut-outs 151, 152, 153 can be easily obtained starting from a symmetrical configuration (FIG. 9a) and removing a part of the flux paths (dark grey areas of FIG. 9b), so as to obtain the final structure of FIG. 9c. From a manufacturing standpoint, the lamination of FIG. 9c can be directly obtained with a single punching operation by simultaneously cutting out the flux barriers (FB) and the cut-outs 151, 152, 153 in the flux paths (FP).

As shown in the above mentioned figures, the magnetically conductive laminations 100 has preferably an asymmetric structure, since the channel-forming cut-outs of the flux paths $FP_{111}, \ldots, FP_{11n}$ of the pole $P_{11}$ (i.e. the cut-out 151) are different from the channel-forming cut-outs of the flux paths $FP_{121}, \ldots, FP_{12n}$ of the other pole $P_{12}$ (i.e. the cut-out 152).

With reference to FIG. 11, the rotor core 2 preferably comprises a first plurality of channels 141 connecting the same first two adjacent cavities 131, 132 and a second plurality of channels 142 connecting the same second two adjacent cavities 132, 133. In practice, the number and positioning of the channels 141, 142, 143 can be varied by appropriately stacking a number of magnetically conductive lamination 100 in different order. In particular, it is preferred to have the channels 141, 142, 143 regularly spaced at constant angles around the axial direction z and at constant distance along said axial direction z so as to have a uniform structure of the rotor 1. The rotor 1 of FIGS. 7-11 can be obtained by using a plurality of magnetically conductive laminations 100 having the same structure.

For instance with reference to FIGS. 10a-10d, the rotor 1 can be obtained by using the magnetically conductive laminations 100 of FIG. 8 superimposed in a number of stacks, the orientation of the magnetically conductive laminations 100 in each stack being the same, the various stack having a different orientation. Also in this case, such different orientations can be obtained by rotation of the magnetically conductive laminations 100 around the z axis of an angle $\alpha=m(\pi/n)$, where m is an integer having value $1 \leq m \leq 2n$ and n is the number of pole pairs (p), and/or by a 180° rotation around said D-axis and/or Q-axis.

Figure 10A:
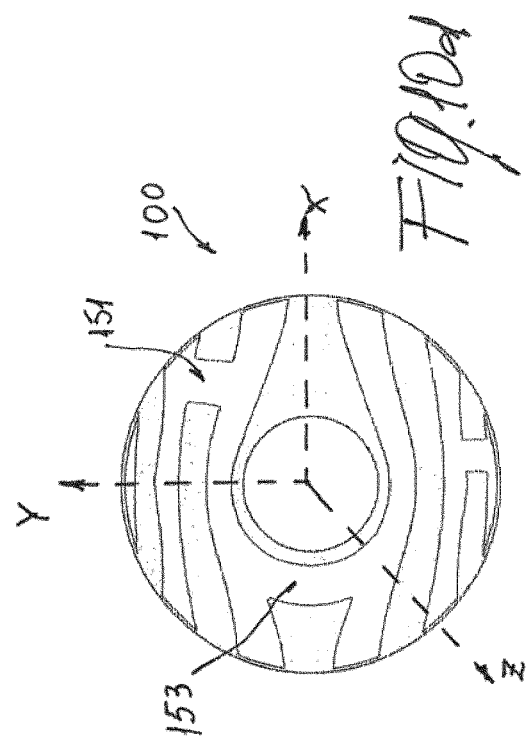
FIGS. 10a-10d show four different orientations of the lamination of FIG. 8 in a xyz reference system.
Figure 10B:
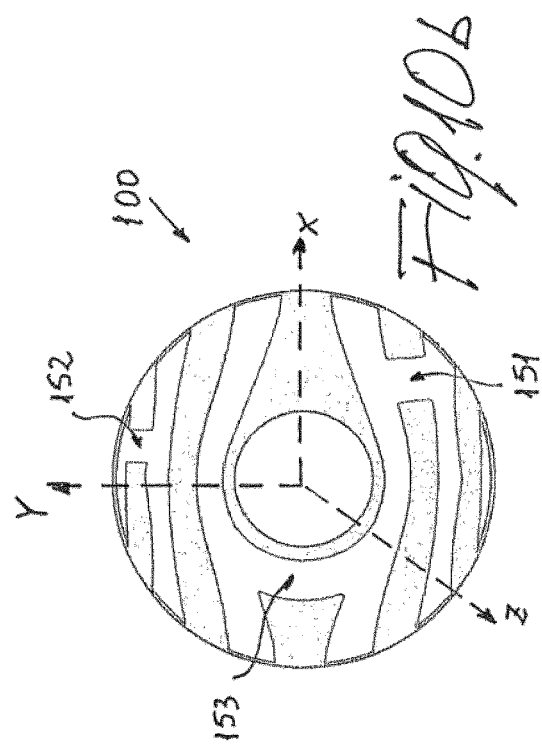
Figure 10C:
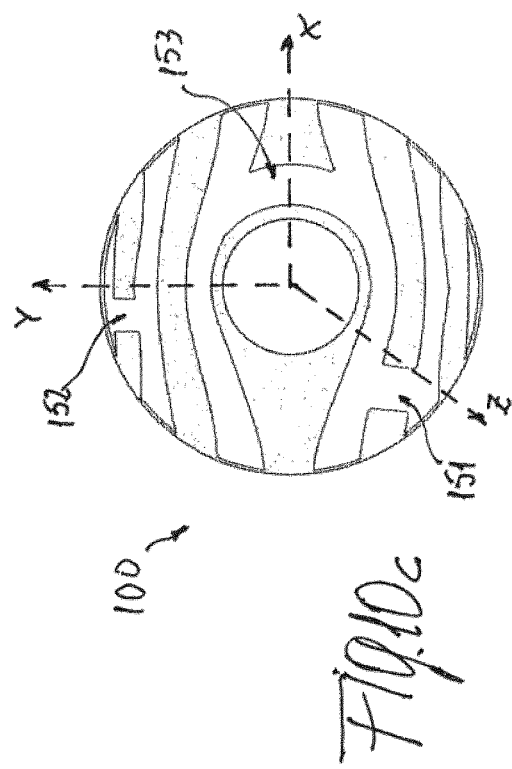
Figure 10D:
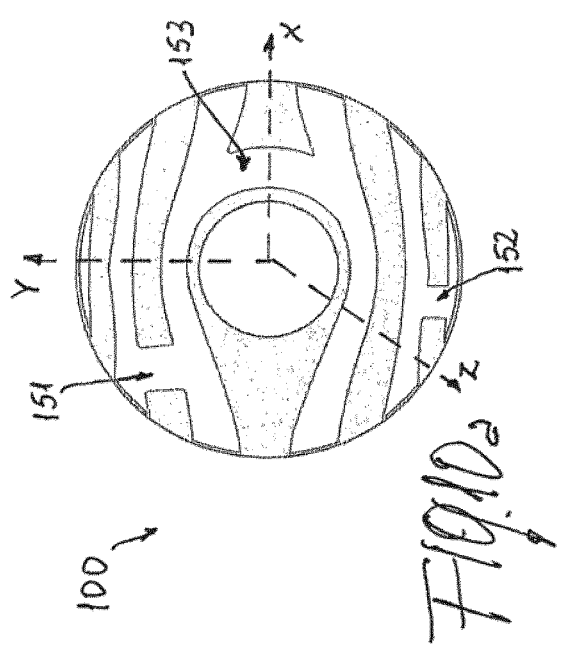

In the case of FIGS. 10a-10d, in which the number of pole pairs (p) is n=1, the first stack can be obtained by superimposing a number of magnetically conductive laminations 100 with the configuration of FIG. 10a; a second stack can be obtained by superimposing a number of magnetically conductive laminations 100 with the configuration of FIG. 10b, said configuration being obtained by rotation of the magnetically conductive laminations 100 around the Q-axis of an angle of 180° and then around the D-axis of an angle of 180° with respect to the configuration of FIG. 10a; a third stack can be obtained by superimposing a number of magnetically conductive laminations 100 with the configuration of FIG. 10c, said configuration being obtained by rotation of the magnetically conductive laminations 100 around said D-axis of an angle of 180° with respect to the configuration of FIG. 10a; and a fourth stack can be obtained by superimposing a number of magnetically conductive laminations 100 with the configuration of FIG. 10d, said configuration being obtained by rotation of the magnetically conductive laminations 100 around said Q-axis of an angle of 180° with respect to the configuration of FIG. 10a.

The number magnetically conductive laminations 100 in a stack, the number of stacks, as well as the different orientations between the stacks, can be chosen according to the needs. After the rotor stacks have been collected together, the cavities 131, 132, 133 and the channels 141, 142, 143, can be filled with aluminum, or a similar non-magnetic material, by using casting techniques, thereby obtained a cage buried inside the rotor core and developing in both the axial and radial direction.

Figure 12:
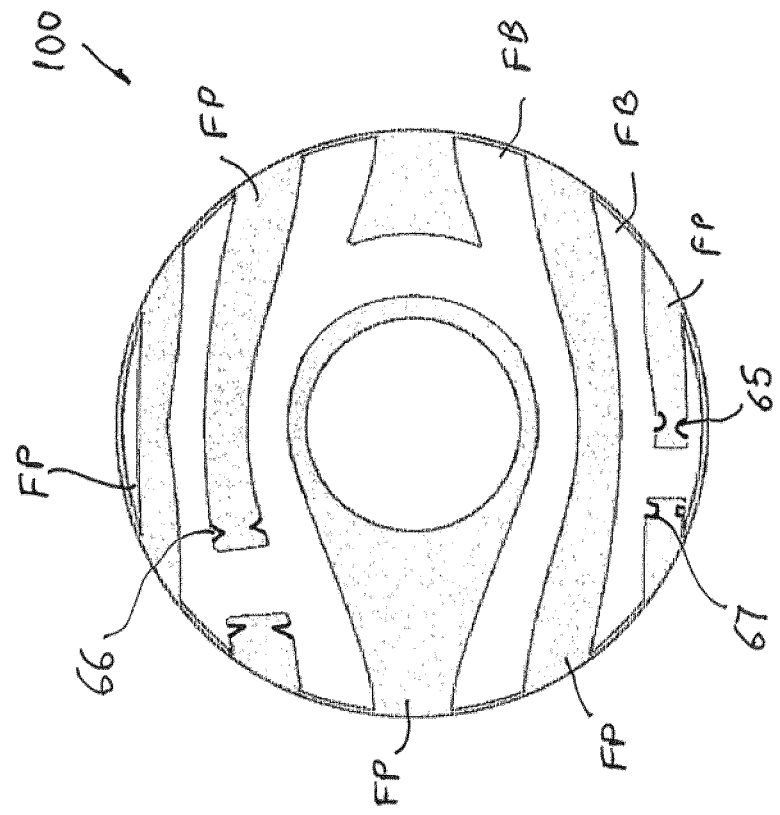
FIG. 12 is a plane view of a first alternative embodiment of the magnetically conductive lamination of FIG. 8.

A first particular embodiment of the two pole rotor of the present invention is shown in FIG. 12. According to this embodiment, one or more notches 65, 66, or 67 can be obtained in the flux paths, in particular in correspondence of the channel forming cut-outs. The notches 65, 66, or 67 can have different shapes (e.g. circular 65, squared 67, triangular 66). Once the cavities 131, 132, 133 and the channels 141, 142, 143 are filled with, e.g. aluminum, also the notches 65, 66, or 67 are filled with such material thereby contributing to the mechanical strength of the rotor structure.

Alternatively, as shown in FIG. 13, the flux paths can be provided with teeth 75, 76, 77, 78 protruding therefrom. The teeth 75, 76, 77, 78 are preferably positioned in correspondence of the channel forming cut-outs and can have different shapes, e.g. circular 75, squared 77, triangular 76, 78.

As clearly shown in the above description, the rotor for a synchronous reluctance machine of the present invention fully achieves the intended aims.

In particular, the presence of bridges in the flux barriers of the magnetically conductive laminations can be avoided, thereby avoiding the known problems of decreased maximum torque and efficiency and increased current adversely affecting the electrical properties of the machine. At the same time the mechanical strength is greatly improved due to the cage structure developing along the axial direction (i.e. along the cavities 31, 32, 33, 34; 131, 132, 133) as well as in the radial direction (i.e. along the channels 41, 42, 43, 44; 141, 142, 143).

Moreover, in terms of manufacturing technology, the rotor can be made by stacking magnetically conductive laminations having the same structure, but a different relative orientation, throughout the whole length of the rotor.

A rotating machine, in particular a synchronous reluctance machine, comprising a rotor as described herein is also part of the present invention.

Several variations can be made to the rotor for a synchronous reluctance machine thus conceived, all falling within the scope of the attached claims. In practice, the materials used and the contingent dimensions and shapes can be any, according to requirements and to the state of the art.

The invention claimed is:

1. A rotor for a rotating electrical machine having, a number n of poles pairs (p) that define corresponding direct pole axis (D-axis) and quadrature axis (Q-axis), comprising:
a rotor core having a plurality of magnetically conductive laminations stacked in a rotor axial direction z, said magnetically conductive laminations comprise cut-out portions forming a plurality of flux barriers (FB) extending continuously with respect to said Q axis from a first rim portion to a second rim portion of said magnetically conductive laminations radially alternated by flux paths (FP), said plurality of flux barriers (FB) forming a corresponding plurality of cavities extending in the rotor core along said axial direction z, at least some of said plurality of cavities being at least partially filled with a magnetically non-conductive material, and further comprising a plurality of channels spaced circumferentially and along the axial direction z, each of said channels transversally connecting two adjacent cavities of said plurality of cavities, at least some of said channels being at least partially filled with a magnetically non-conductive material, wherein said magnetically conductive laminations, for at least one pole pair ($p_1$), at least a part of the flux paths ($FP_{111}, \ldots, FP_{11n}$) of one pole ($P_{11}$) are different from the flux paths $FP_{121}, \ldots, FP_{12n}$ of the other pole ($P_{12}$).

2. The rotor according to claim 1, wherein said one or more of said flux paths (FP) in said magnetically conductive lamination have at least one channel-forming cut-out connecting two adjacent flux barriers (FB) of the same pole and/or of a different pole.

3. The rotor according to claim 2, wherein, said magnetically conductive lamination, for at least one pole pair ($p_1$) having one pole ($p_{11}$) with channel-forming cut-outs of the flux paths ($FP_{111}, FP_{11n}$) and another pole ($P_{12}$) with channel-forming cut-outs of the flux paths ($FP_{112}, \ldots, FP_{12n}$), at least a part of the channel-forming cut-outs of the flux paths ($FP_{111}, FP_{11n}$) of one pole ($P_{11}$) are different from the channel-forming cut-outs of the flux paths ($FP_{112}, \ldots, FP_{12n}$) of the other pole ($P_{12n}$).

4. The rotor according to claim 1, wherein the rotor core comprises a first plurality of channels connecting the same first two adjacent cavities and a second plurality of channels connecting the same second two adjacent cavities.

5. The rotor according to claim 1, wherein in the rotor core a first plurality of channels connecting the same two adjacent cavities are regularly spaced at constant angles around said axial direction z.

6. The rotor according to claim 4, wherein at least a length of said rotor core is made by a plurality of magnetically conductive laminations having the same structure.

7. The rotor according to claim 6, wherein said at least a length of said rotor core, a first portion is made by a first stack of magnetically conductive laminations having the same structure and a same first orientation with respect to a xyz reference system in which the z axis is aligned with the rotor axial direction and at least one of the x and y axis is aligned with at least one of said 0-axis and/or Q-axis, and at least a second portion is made by a second stack of magnetically conductive laminations having the same structure and a same second orientation with respect to said xyz reference system, said first orientation being different from said second orientation.

8. The rotor according to claim 6, wherein said at least a length of said rotor core comprises a plurality of portions made by a plurality of stacks of magnetically conductive laminations having the same structure and the same orientation n each stack, and a plurality of different orientations for different stacks with respect to said xyz reference system, said plurality of orientations being obtained by rotation of said magnetically conductive laminations around said z axis of an angle $\alpha = m(\pi/n)$, where m is an integer having value $1 \leq m \leq 2n$ and n is the number of pole pairs (p), and/or by a 180° rotation around said D-axis and/or Q-axis.

9. The rotor according to claim 8, wherein said at least a length of said rotor core comprises at least four portions made by a plurality of stacks of magnetically conductive laminations having the same structure and the same orientation in each stack, and corresponding four different orientations for said four portions with respect to said xyz reference system.

10. The rotor according to claim 9, wherein the number of pole pairs (p) is n=2, and in that the magnetically conductive laminations in a first portion of said four portions has a first orientation with respect to said xyz reference system, the magnetically conductive laminations in a second portion has a second orientation with respect to said xyz reference system, said second orientation being obtained by rotation of the magnetically conductive laminations around said z axis of an angle $\alpha = m(\pi/n)$ with respect to said first orientation, the magnetically conductive laminations in a third portion has a third orientation with respect to said xyz reference system, said third orientation being obtained by rotation of the magnetically conductive laminations around said z axis of an angle $\alpha = \pi$ with respect to said first orientation, the magnetically conductive laminations in a fourth portion has a fourth orientation with respect to said xyz reference system, said fourth orientation being obtained by rotation of the magnetically conductive laminations around said z axis of an angle $\alpha = m(\pi/n)$ with respect to said first orientation.

11. The rotor according to claim 9, wherein the number of pole pairs (p) is n=1, and in that the magnetically conductive laminations in a first portion of said four portions has a first orientation with respect to said xyz reference system, the magnetically conductive laminations in a second portion has a second orientation with respect to said xyz reference system, said second orientation being obtained by rotation of the magnetically conductive laminations around said Q-axis of an angle of 180° and then around said D-axis of an angle of 180° with respect to said first orientation, the magnetically conductive laminations in a third portion has a third orientation with respect to said xyz reference system, said third orientation being obtained by rotation of the magnetically conductive laminations around said D-axis of an angle of 180° with respect to said first orientation, the magnetically conductive laminations in a fourth portion has a fourth orientation with respect to said xyz reference system, said fourth orientation being obtained by rotation of the magnetically conductive laminations around said Q-axis of an angle of 180° with respect to said first orientation.

12. The rotor according to claim 4, wherein one or more of said flux paths (FP) comprises one or more notches and/or one or more teeth.

13. The rotor according to claim 4, wherein one or more of said flux paths (FP) have a width which is not uniform and which is comprised between a Wmax and a Wmin, said channel-forming cut-outs being formed in areas of said flux paths (FP) where the width is Wmax.

14. An electrical machine comprising a rotor according to claim 1.

15. The rotor according to claim 7, wherein said at least a length of said rotor core comprises a plurality of portions made by a plurality of stacks of magnetically conductive laminations having the same structure and the same orientation n each stack, and a plurality of different orientations for different stacks with respect to said xyz reference system, said plurality of orientations being obtained by rotation of said magnetically conductive laminations around said z axis of an angle $\alpha=m(\pi/n)$, where m is an integer having value $1 \le m \le 2n$ and n is the number of pole pairs (p), and/or by a 180° rotation around said D-axis and/or Q-axis.

16. The rotor according to claim 15, wherein said at least a length of said rotor core comprises at least four portions made by a plurality of stacks of magnetically conductive laminations having the same structure and the same orientation in each stack, and corresponding four different orientations for said four portions with respect to said xyz reference system.

17. The rotor according to claim 3, wherein the rotor core comprises a first plurality of channels connecting the same first two adjacent cavities and a second plurality of channels connecting the same second two adjacent cavities.

18. The rotor according to claim 17, wherein in the rotor core a first plurality of channels connecting the same two adjacent cavities are regularly spaced at constant angles around said axial direction z.

19. The rotor according to claim 18, wherein at least a length of said rotor core is made by a plurality of magnetically conductive laminations having the same structure.

20. A rotor for a rotating electrical machine having a number n of poles pairs (p) that define corresponding direct pole axis (D-axis) and quadrature axis (Q-axis), comprising:

a rotor core having a plurality of magnetically conductive laminations stacked in a rotor axial direction z, said magnetically conductive laminations comprise cut-out portions forming a plurality of flux barriers (FB) extending continuously with respect to said Q axis from a first rim portion to a second rim portion of said magnetically conductive laminations radially alternated by flux paths (FP), said plurality of flux barriers (FB) forming a corresponding plurality of cavities extending in the rotor core along said axial direction z, at least some of said plurality of cavities being at least partially filled with a magnetically non-conductive material, and further comprising a plurality of channels spaced circumferentially and along the axial direction z, each of said channels transversally connecting two adjacent cavities of said plurality of cavities, at least some of said channels being at least partially filled with a magnetically non-conductive material, and wherein at least a length of said rotor core is made by a plurality of magnetically conductive laminations having the same structure, wherein said at least a length of said rotor core, a first portion is made by a first stack of magnetically conductive laminations having the same structure and a same first orientation with respect to a xyz reference system in which the z axis is aligned with the rotor axial direction and at least one of the x and y axis is aligned with at least one of said D-axis and/or Q-axis, and at least a second portion is made by a second stack of magnetically conductive laminations having the same structure and a same second orientation with respect to said xyz reference system, said first orientation being different from said second orientation.

* * * * *